United States Patent
Neubert et al.

(10) Patent No.: US 7,465,376 B2
(45) Date of Patent: Dec. 16, 2008

(54) METHOD AND DEVICE FOR TREATING LIQUIDS

(75) Inventors: Joachim Neubert, Nordhackstedt (DE); Karl-Ferdinand Staab, Weil der Stadt (DE)

(73) Assignee: Susanne Neubert (DE)

( * ) Notice: Subject to any disclaimer, the term of this patent is extended or adjusted under 35 U.S.C. 154(b) by 749 days.

(21) Appl. No.: 10/468,755

(22) PCT Filed: Feb. 9, 2002

(86) PCT No.: PCT/EP02/01368

§ 371 (c)(1),
(2), (4) Date: Dec. 29, 2003

(87) PCT Pub. No.: WO02/068337

PCT Pub. Date: Sep. 6, 2002

(65) Prior Publication Data

US 2004/0099522 A1    May 27, 2004

(30) Foreign Application Priority Data

Feb. 22, 2001   (DE) ............................... 101 08 528

(51) Int. Cl.
*B01D 1/28*   (2006.01)
*B01D 3/34*   (2006.01)
*B01D 3/42*   (2006.01)
*C02F 1/04*   (2006.01)

(52) U.S. Cl. ........................ 203/1; 159/2.1; 159/16.1; 159/24.1; 159/46; 159/47.1; 159/DIG. 27; 159/DIG. 28; 202/160; 202/176; 202/202; 202/206; 203/2; 203/23; 203/24; 203/39; 203/49; 203/88; 203/94; 203/98; 203/DIG. 8; 210/634; 210/763; 210/774

(58) Field of Classification Search ............... 159/2.1, 159/16.1, 24.1, 46, 47.1, DIG. 16, DIG. 20, 159/DIG. 27, DIG. 28; 202/160, 176, 202, 202/205, 206; 203/1, 2, 11, 22–27, 39, 49, 203/94, 98, DIG. 8, 88; 210/634, 763, 774
See application file for complete search history.

(56) References Cited

U.S. PATENT DOCUMENTS 4,327,184 A * 4/1982 Johnson et al. .......... 435/300.1
4,915,792 A * 4/1990 Zeilon ......................... 203/22

(Continued)

FOREIGN PATENT DOCUMENTS

WO          0103794       *  1/2001

*Primary Examiner*—Virginia Manoharan
(74) *Attorney, Agent, or Firm*—McNair Law Firm, P.A.; Seann P. Lahey

(57) ABSTRACT

The invention provides for the removal of impurities from treatment fluid including a base liquid and a variety of impurities contained in the base liquid by conveying the treatment fluid to at least one preheating separating device, including a preheating heat exchanger and a separator unit, before the admixture of a carrier gas to the treatment fluid. The treatment fluid is preheated by the preheating heat exchanger to a temperature below the boiling temperature of a base liquid so that the liquid impurities with lower boiling temperatures than the base liquid are evaporated and expelled thermally, whereby the evaporated and expelled impurities are separated in the separator unit of the preheating separator device. The treatment fluid is then evaporated and separated from impurities having a higher boiling point than the base liquid.

45 Claims, 2 Drawing Sheets

U.S. PATENT DOCUMENTS

| | | | |
|---|---|---|---|
| 4,985,122 A * | 1/1991 | Spencer | 203/11 |
| 6,355,145 B1 * | 3/2002 | Kresnyak et al. | 203/1 |
| 6,508,916 B1 * | 1/2003 | Razzaghi et al. | 203/11 |
| 6,551,466 B1 * | 4/2003 | Kresnyak et al. | 203/1 |
| 6,911,121 B1 * | 6/2005 | Beckman | 203/49 |
| 6,984,292 B2 * | 1/2006 | Kresnyak et al. | 203/1 |

* cited by examiner

METHOD AND DEVICE FOR TREATING LIQUIDS

FIELD OF THE INVENTION

The present invention relates to a method and device for removing impurities from a fluid, and more particularly, to a method and device for the economical treatment of a fluid containing a wide variety of liquid and gaseous impurities of different boiling points.

BACKGROUND OF THE INVENTION

A method and a device for treating a waste liquid are already known from EP 0 142 018 B1, where the waste liquid consisting of a base liquid and non-evaporated solid impurities contained therein is loaded into a carrier gas stream. This mixture is then heated in an evaporator to a temperature above the saturation temperature of the water vapor produced in the heating process. The solid particles are separated from this overheated mixture of carrier gas and dry vapor in a separator unit. Starting out from the separator unit, the carrier gas is first compressed by means of a compressor and then conveyed through the evaporator in order to heat the mixture to be cleaned, consisting of carrier gas and waste liquid. At the same time the mixture of carrier gas and dry vapor, freed of impurities, cools in the evaporator as a result of its heat transfer. During this process the base liquid which is conveyed in the form of hot condensate to a heat exchanger for the preheating of the waste liquid condenses, while on the other hand the carrier gas is conveyed to the evaporator input where a mixing of carrier gas and preheated waste liquid takes place.

This method is suited to obtain solids and/or substances contained in a waste liquid that cannot be evaporated, thus achieving a degree of cleanliness of the departing vapor that is approximately equal to the degree of cleanliness of distilled water. It was found, however, that when a waste liquid is charged with essentially liquid impurities, such as e.g. oil-containing organic materials, incrustations may occur on the evaporator side of the heat exchanger, requiring frequent cleaning of the heat exchanger. In addition, considerable losses of carrier gas occur during the separation process, as well as during separation in the evaporator of carrier gas from condensate, which can have an adverse effect in the long run on an optimal execution of the process.

A method and device for the treatment of a waste liquid consisting of a base liquid and impurities contained therein is furthermore known from DE 197 41 806 A1. Here the waste liquid to be cleaned is dispersed in a carrier gas stream, preheated in a heat exchanger, and the impurities are then eliminated in the form of concentrate in a separator unit. The concentrate is post-dried at temperatures up to 170° C. in an evaporator with vent compression downstream of the concentrate separator unit, whereby the vent condensate is conveyed back into the overheated mixture of carrier gas and vapor and is mixed with it. The mixture of carrier gas and dry vapor cleaned after the separation of the impurities is then compressed in a compressor and is conveyed to a heat exchanger for the heating of the mixture of preheated waste liquid and carrier gas, whereby the base liquid condenses. This condensate is conveyed into a condensate collector in its form of a stripper and is atomized through a spray nozzle at that location. The volatile components liberated thereby are conveyed via a gas conduit through cooled water contained in a liquid container, whereby the water-soluble components are dissolved in the water while the remaining gas is let out into the surrounding air via an output conduit. The condensate produced in the stripper during atomization is collected on the bottom and is conveyed to a heat exchanger in which the still prevailing residual heat is transferred to the waste liquid to be cleaned in order to preheat it.

It is a disadvantage in this case that the carrier gas must be fed continuously into the system, because a large portion of the carrier gas is emitted directly into the surrounding air via the condensate collecting container.

The constant feeding of fresh carrier gas into the system is very expensive on the one hand, and on the other hand reduces the effectiveness of the overall installation considerably. Due to these considerable losses in carrier gas, expensive inert gas cannot be used as the carrier gas in such an installation because the operating costs would then become excessive. Such an installation can therefore be operated economically only with fresh air as the carder gas, but this is problematic because of the way certain components of the air can react with certain components of some waste liquids, so that the separation of the impurities dissolved in the waste liquid may become more difficult. For example, the oxygen contained in the carrier gas air is reduced in the case of wet oxidation so that carrier gas must be replenished by providing more air. This also means that an increased carrier gas output is required through the stripper in order to cover the needed oxygen requirement. Since the water reserve in the downstream cooling water container is also subjected to greater stress in that case, an undesirable output of vaporous materials contained in the carrier gas is produced and endangers the environment.

In addition, the residual gas emitted into the surrounding air via an output conduit typically still contains a considerable amount of volatile condensate impurities so that the environment is adversely affected.

Furthermore, it is a disadvantage here that only certain liquid impurities are separated. In case of treatment fluids with a plurality of liquid impurities having different boiling temperatures and containing relatively large quantities of gaseous impurities, the danger exists that a considerable portion of the liquid and/or gaseous impurities cannot be removed with this method and the desired treatment goal cannot be reached. This is because, depending on the treatment fluid, a significant portion of the liquid impurities remain in the base liquid after condensation to pollute the base liquid, while the gaseous impurities together with the carrier gas are emitted into the environment in an undesirable manner if they are not water-soluble. The danger of environmental pollution is potentially great in this case.

This method is therefore suitable on the whole only for the treatment of a very narrow spectrum of treatment fluids, requiring a great number of treatment fluids. Thus it is a particular disadvantage that this method is not suitable for obtaining drinking and service water from sea or brine water, since large quantities of $CO_2$ are produced as the $HCO_3$ disintegrates thermally, compounds which must be removed from the system and a task which is impossible for the above-mentioned method. By heating the vapors in the concentrate evaporator to temperatures up to 170° C., an evaporation of contents of the concentrate is achieved that are then precipitated in the form of exhaust vapors and are fed together with them into the mixture of carrier gas and dry vapor. As a result an undesirable second contamination of the mixture of carrier gas and dry vapor occurs thereby resulting in an undesirable pollution of the process when the vapor condenses.

From WO 01/03794 A1, a method and device are known for the treatment of a waste liquid in which the waste liquid consists of a base liquid and liquid impurities contained therein. In order to separate the liquid impurities, a mixture of waste liquid and carrier gas is evaporated into a wet mixture of carrier gas and dry vapor in such a manner that the base liquid is evaporated and the impurities having a higher boiling temperature than the base liquid are left over in the form of a residual liquid portion.

Following this, the wet mixture of carrier gas and vapor is conveyed to a concentrate separator unit in which the residual liquid portion is separated as a concentrate. The mixture of carrier gas and dry vapor, freed of residual liquid, is compressed and then cooled so that the base liquid is condensed and can be separated in a downstream condensate separator unit.

The carrier gas separated at the condensate separator unit is conveyed in a closed circuit in such a manner that a first partial mass flow of the carrier gas separated at the condensate separator unit is conveyed directly to the waste liquid in an admixing device. A second partial mass flow of the carrier gas separated at the condensate separator unit is conveyed through a gas dryer to be dried, and then in the form of dry carrier gas, conveyed again to the waste liquid in the admixing device.

Before the waste liquid is conveyed to the admixing device for the admixing of the carrier gas, a two-step pre-heating is effected by a condensate/waste liquid heat exchanger with the hot condensate coming from the condensate collecting container as well as by a concentrate/waste liquid heat exchanger with the hot concentrate coming from the concentrate collecting container.

The heat supply for the evaporation of the mixture of carrier gas and vapor into the wet mixture of carrier gas and vapor takes place through two evaporators/condensation heat exchangers by means of the compressed and cleaned mixture of carrier gas and dry vapor flowing from the concentrate separator unit that is able to condense at least partially in this evaporator/condensation heat exchanger through heat emission.

By means of such a method and device to carry out the method it is possible to reduce the overall energy expenditure considerably, since nearly all the hot currents are used to heat colder currents. Thanks to the two-step preheating of the waste liquid before it is conveyed to the admixing device, it is furthermore possible to adjust the temperature of the waste liquid exactly so that the dispersion of the waste liquid in the carrier gas is promoted by nearly spontaneous evaporation following the admixing of carrier gas.

In addition, the losses in carrier gas can be minimized considerably by the closed carrier gas circuit between the condensate separator unit and the carrier gas admixing device.

In spite of these advantages, still only certain liquid impurities can be separated. Again, in case of treatment fluids containing a plurality of liquid impurities having different boiling temperatures as well as a relatively large amount of gaseous impurities, the danger exists that a considerable portion of the liquid and/or gaseous impurities cannot be removed by this method so that they continue to contaminate the base liquid, generally water, even after the treatment. Due to the closed carrier gas circuit, the gaseous impurities furthermore increase here in an undesirable manner in the carrier gas circuit, especially when sea or brine water is to be treated in order to obtain drinking and/or service water, as a large quantity of $CO_2$ are produced among other impurities, with the thermal decomposition of $HCO_3$. In such a case, the installation must be stopped at regular intervals and the carrier gas must be freed of the gaseous impurities accumulated in the gas circuit because of the closed carrier gas circuit. This is not economical and reduces the effectiveness of the installation. Furthermore, such an upgrading for the sake of a longer running time of the installation requires a larger layout and dimensioning of the pipe conduits and devices, substantially increasing costs. Therefore this treatment method is also only suitable for a certain, relatively narrow spectrum of treatment fluids.

In addition, known distillation methods without the utilization of carrier gas as conveying gas are known from WO 87/07847 and WO 98/31445 and relate to a fundamentally different type of method whereby a water cleaning and water desalinization by means of vacuum distillation is carried out according to WO 87/07847, and fouling of the installation itself is to be avoided according to WO 98/31445.

Accordingly, it is therefore the object of the present invention to further develop a method and device for the treatment of liquids, by means of which an effective and economical treatment of treatment fluids containing a plurality of liquid impurities having different boiling temperatures and/or a large quantity of gaseous impurities, in particular the treatment of sea and/or brackish water of a waste liquid and/or waste water can be carried out.

This and other objectives and advantages of the present invention will become apparent from the following more detailed descriptions.

SUMMARY OF THE INVENTION

The present invention provides a method for treating fluids containing a variety of liquid, gaseous, and saline impurities contained or dissolved in the fluid by separating the impurities from the fluid. The method comprises the steps of conveying a treatment fluid, defined as a base liquid containing impurities, to a preheating separating device in which the treatment fluid is preheated to a temperature below the boiling temperature of the base liquid, so that impurities with lower boiling points than the base liquid are separated from the base liquid; conveying a carrier gas to the treatment fluid through a closed carrier gas circuit for mixing with the treatment fluid; evaporating the mixture of carrier gas and treatment fluid in such a manner that the base liquid is evaporated and impurities having boiling temperatures higher than the boiling point of the base liquid are left behind as a residual fluid portion, and the mixture of carrier gas and treatment fluid forms a damp mixture of carrier gas and treatment fluid vapor; conveying the damp mixture of carrier gas and treatment fluid vapor to a concentrate separator unit so that the residual fluid portion is separated as a concentrate; compressing the mixture of carrier gas and treatment fluid vapor into a mixture of carrier gas and dry treatment fluid vapor; cooling the mixture of carrier gas and dry treatment fluid vapor; conveying the mixture of carrier gas and dry treatment fluid vapor to a downstream condensate separator unit so that the base liquid condenses and is separated from the carrier gas; and, returning carrier gas separated from the dry treatment fluid vapor back for remixing with the treatment fluid, whereby a variety of liquid, gaseous, and saline impurities contained or dissolved in the fluid and having different boiling points are removed from the treatment fluid.

Preferably, the treatment fluid is conveyed consecutively through at least two preheating separator devices which include a preheating heat exchanger and a separator unit. The treatment fluid is preheated in at least one the preheating heat exchanger of the preheating separator devices, and the treatment fluid is conveyed to a relaxation device, included in the separator unit, in which impurities with low boiling temperature than the base liquid are separated as vaporous impurities from the base liquid.

Preferably the method includes conveying the vaporous impurities with a lower boiling temperature than the base liquid from the relaxation device, via a conduit having a cooling device with a heat exchanger, to the separator unit and storing the vaporous impurities in a collecting container of the separator unit in such a manner that a negative pressure is produced in the conduit by cooling the vaporous impurities passing through the conduit so that the vaporous impurities are sucked out of the relaxation device and into the collecting container.

In a further advantageous embodiment, the preheating heat exchanger comprises a condensate/treatment fluid heat exchanger in which preheating of the treatment fluid is effected by means of hot condensate directed from a condensate container. Additionally, it is preferable to have a concentrate/treatment fluid heat exchanger installed upstream from the at least one preheating separator device for providing additional heat for the preheating of the treatment fluid by using hot concentrate coming from a concentrate-collecting container.

Advantageously, the treatment fluid is preheated as closely as possible to the evaporation temperature of the base liquid in the preheating heat exchanger into which the carrier gas is conveyed to the treatment fluid for mixing.

Preferably, at least one evaporator/condensation heat exchanger is provided for supplying a portion of heat needed for the evaporation of the base liquid into the damp mixture of carrier gas and treatment fluid vapor by at least partially condensing the out-flowing compressed mixture of the carrier gas and dry treatment fluid vapor in the at least one evaporator/condensation heat exchanger.

In the preferred embodiment, a partial mass flow of the carrier gas separated at the condensate separator unit is conveyed directly to the treatment fluid for mixing, and a second partial mass flow of the carrier gas separated at the condensate separator unit is conveyed through a gas drying apparatus to be dried and is then fed back to the treatment fluid as dried carrier gas for mixing. The treatment fluid is also finely dispersed by an admixing device into the second partial mass flow of dry gas. Advantageously, the method includes conveying a catalyst into the preheated treatment fluid before the treatment fluid is introduced into the admixing device.

In a preferred embodiment, a heat generator is provided having a heat exchanger, connected into a pressure conduit for heating the mixture of carrier gas and dry treatment fluid vapor.

Preferably, treatment fluid vapors occurring in the concentrate-collecting container are conveyed in a compressed state to the pressure conduit containing the mixture of carrier gas and dry treatment fluid vapor. Additionally, treatment fluid vapors occurring in the concentrate-collecting container are conveyed in a compressed state to a bypass conduit. Advantageously, a second condensate separator unit is provided as an emergency/relief condensate separator unit to which the mixture of carrier gas and dry treatment fluid vapor is conveyed via the bypass conduit while main conduits are closed or reduced. Additionally, carrier gas separated from the treatment fluid vapor is conveyed from a gas outlet of the emergency/relief condensate separator unit to the closed carrier gas circuit, and treatment fluid condensate is conveyed to a liquid outlet system of the condensate separator unit or, in the case of an emergency pressure reduction, to a pump sump.

In the preferred embodiment, carrier gas in the closed carrier gas circuit is replenished from a closed carrier gas storage container in the event of a loss of carrier gas.

Preferably, a degassing container is also provided for removing remaining dissolved gaseous substances from the treatment fluid after relaxation. Advantageously, the method further includes pumping treatment fluid condensate from the degassing container into areas of the system to be clarified.

In the preferred embodiment, oxygen from an oxygen container having an oxygen evaporator is conveyed in a controlled manner to the carrier gas for wet oxidation.

The present invention also provides a device for separating impurities from a treatment fluid, wherein the treatment fluid includes a base liquid to be separated from a variety of liquid, gaseous, and saline impurities contained or dissolved in the base liquid. In the preferred embodiment, the device comprises at least one preheating separator device that includes at least one preheating heat exchanger and a separator unit disposed downstream of the preheating heat exchanger for preheating and pre-cleaning the treatment fluid; the preheating heat exchanger preheating the treatment fluid to a temperature below the boiling temperature of the base liquid; the separator unit separating liquid impurities from the base liquid that have a boiling temperature lower than that of the base liquid; an admixing device disposed downstream of the preheating separator device; a closed carrier gas circuit conveying a carrier gas to the admixing device; the admixing device providing a mixture of carrier gas and treatment fluid; at least one evaporator/condensation heat exchanger disposed downstream of the admixing device for evaporating the mixture of carrier gas and treatment fluid into a damp mixture of carrier gas and treatment fluid vapor in which the base liquid is evaporated and the liquid impurities with boiling temperatures above the boiling temperature of the base liquid are left over as a residual liquid portion; a concentrate separator disposed downstream of the at least one evaporator/condensation heat exchanger for separating the residual liquid portion and providing a mixture of carrier gas and dry treatment fluid vapor from the damp mixture of carrier gas and treatment fluid vapor; and, a condensate separator disposed downstream of the concentrate separator to which the mixture of carrier gas and dry treatment fluid vapor is conveyed after passing through the evaporator/condensation heat exchanger to condense the treatment fluid vapor and separate the treatment fluid from the carrier gas.

Preferably, at least two preheating separator devices are arranged in a consecutive manner for preheating and precleaning the treatment fluid and the separator unit includes a relaxation device for separating vaporous impurities from the base liquid which have a boiling point lower than that of the base liquid. The relaxation device may comprise a relaxation container and pump. Alternatively, the relaxation device may also comprise a pervaporation membrane apparatus.

In the preferred embodiment, the separator unit includes a cooling device having a heat exchanger, and a collecting container; the cooling device and collecting container following the relaxation device and being connected by a conduit having a negative pressure through which the vaporous impurities are sucked out of the relaxation device to be separated from the base liquid.

Advantageously, the preheating heat exchanger includes a condensate/treatment fluid heat exchanger for supplying additional heat to preheat the treatment fluid. A pressure conduit having a compressor for increasing the pressure and temperature of the mixture of carrier gas and dry treatment fluid vapor connects the concentrate separator to the condensate separator for conveying the mixture of carrier gas and dry treatment fluid vapor from the concentrate separator to the condensate separator. At least one measuring device is carried by the pressure conduit for monitoring pressure and temperature of the mixture of carrier gas and dry treatment fluid vapor. In the preferred embodiment, the pressure conduit is coupled via a heat exchanger to a heat generator to provide additional heat during start-up.

The device includes at least one actuator, at least one control valve, and at least one measuring device each coupled to a control device and operatively associated with the heat generator for automatic switching on and off of the heat generator.

Advantageously, carrier gas is conveyed through a closed carrier gas circuit between the condensate separator and the admixing device so that a partial mass flow of the carrier gas separated at the condensate separator can be conveyed directly to the admixing device via a carrier gas conveying conduit, and a second partial mass flow of the carrier gas separated at the condensate separator is conveyed to the admixing device.

Preferably, a gas dryer is provided for drying carrier gas coming from the condensate collecting container. In the preferred embodiment, the gas dryer consists of a pervaporation membrane with a cooling device and heat exchanger connected to a downstream collecting container. At least one gas conduit leads from the condensate separator to the condensate collecting container through the gas dryer and back to a carrier gas feed conduit through a compressor. A carrier gas storage container is connected to the carrier gas circuit for providing additional carrier gas to compensate for losses of carrier gas. An oxygen container is connected to the gas conduit going from the condensate collecting container to the carrier gas feed conduit for a wet oxidation. A degassing container is also disposed downstream of the condensate collecting container for degassing treatment fluid condensate.

A second condensate separator is provided as an emergency/relief condensate separator to which carrier gas and treatment fluid vapors can be conveyed from the concentrate collecting container via a bypass conduit from the concentrate separator. The emergency/relief condensate separator may also be provided at a gas outlet having a gas exhaust conduit going to the carrier gas feed conduit and the admixing device. Advantageously, an emergency/relief condensate separator may be provided at a condensate output with at least one condensate conduit going to the condensate collecting container. Advantageously, an exhaust air filter may be disposed in the pressure conduit and the emergency/relief condensate separator for emergency relief of operating pressure into free space.

In the preferred embodiment, condensate occurring in the emergency/relief condensate separator is conveyed via a conduit to a pump sump at the admission of treatment fluid into the device. Preferably, a clarification device comprising a condensate pump, a suction conduit, and a degassing container coupled via an admixing device into a corresponding process conduit is provided for clarification of at least the evaporator/condensation heat exchanger. Preferably, a vapor condensation device comprising a cooling device with a condensate collecting container is connected downstream of the concentrate separator for vapor precipitation.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

Figure 1:
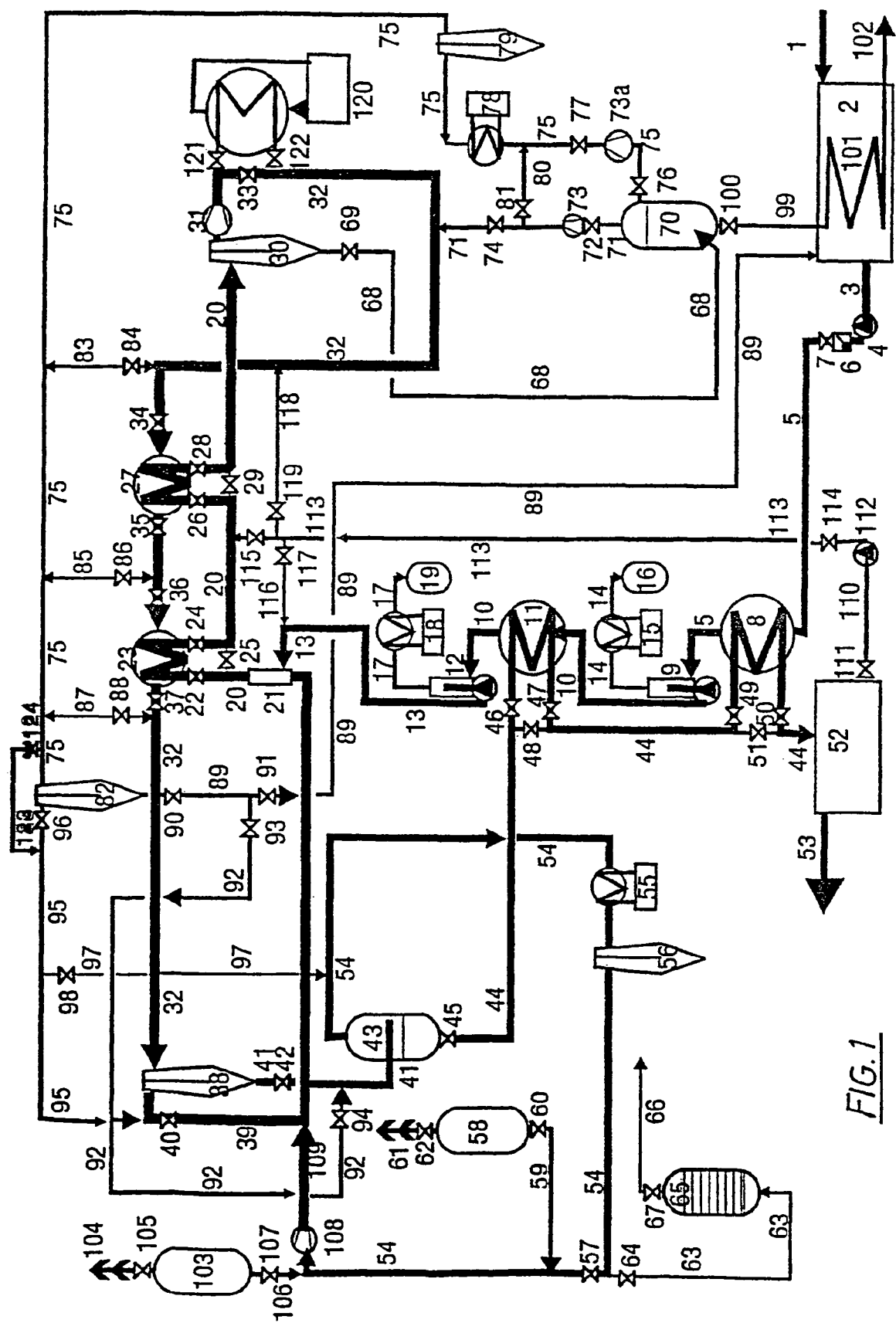
FIG. 1 shows a schematic flow chart of a device for the treatment of a treatment fluid according to a first method application; and, FIG. 2 shows a schematic flow chart of a device for the treatment of a treatment fluid with an alternative method application with respect to preheating and pre-cleaning.

The invention provides for a treatment fluid (the fluid to be treated) to be conveyed before the admixture of carrier gas to at least one preheating separating device, each preferably provided with a preheating heat exchanger and a separator unit following the preheating heat exchanger, in order to be preheated. In it, the treatment fluid is preheated by the preheating heat exchanger to a temperature below the boiling temperature of the base liquid, so that the liquid impurities with lower boiling temperatures than the base liquid may evaporate and/or the gaseous impurities may be expelled thermally, whereby the evaporated and/or expelled impurities are separated in the separator unit of the preheating separator device, of which at least one is provided.

For this reason, those liquid impurities having a lower boiling temperature and/or those gaseous impurities that cannot be separated once the carrier gas has been admixed are advantageously already separated before conveying the treatment fluid to a carrier gas admixing device. In all previously known solutions according to the state of the art, these impurities have, until now, remained in the base liquid as residual impurities since only those liquid impurities whose boiling temperatures were higher than that of the base liquid could be separated as a residual liquid portion by using a carrier gas as the conveying gas once the carrier gas has been admixed and the base liquid has been evaporated. Due to the expulsion of the gaseous impurities from the treatment fluid before the addition of the carrier gas, the achieved result is that these gaseous impurities cannot increase in the closed carrier gas circuit. Downtimes of the installation to separate gaseous impurities from the carrier gas are thereby advantageously avoided so that overall economic operation of an installation according to the invention while maintaining long running times is very well possible. In addition, and contrary to conventional installation, the pipe conduits and devices overall can be designed with smaller dimensions and are thus more economical. This is furthermore due in part to the fact that the withdrawal of liquid impurities with a boiling temperature below that of said base liquid before the addition of carrier gas has already removed part of the treatment fluid in the form of impurities.

With such an application of the method and device according to the invention, whereby a carrier gas is added to the treatment fluid in the form of conveying gas, a separation of the liquid impurities fractioned in accordance with the boiling point temperatures of the liquid impurities and/or an expulsion of the gaseous impurities from the base liquid treated is thereby advantageously effected for environment friendly removal or re-utilization of impurities. The recovered impurities can well be valuable substances that can be reused in other applications and need not be discarded.

The device and method according to the invention make it therefore possible to achieve a complete separation of nearly all liquid and gaseous impurities from the treatment fluid so that the effectiveness of the overall installation is improved considerably as a result, and an overall highly economical operation of the installation is made possible to provide an advancement of the art.

With such a method and such a device it is particularly possible to effectively and economically treat a very wide spectrum of the most heterogeneous treatment fluids containing a great number of the most heterogeneous liquid and/or gaseous impurities. Thus the utilization of such a method and device is especially well suited and advantageous for obtaining water, e.g. extracting drinking or service water from sea and/or briny water, since the $CO_2$ liberated during preheating and pre-cleaning, as well as the $CO_2$ produced as a result of the thermal disintegration of $HCO_2$, can be separated and removed. The salts present in the base liquid can be separated through evaporation of the base liquid as brine in the concentrate separator unit.

An especially effective use of the installation is achieved if the fluid to be treated is further conveyed to at least two preheating separator devices connected one after the other. By means of such a multi-step preheating and pre-cleaning, an exceedingly efficient separation is achieved regarding the separation of the liquid impurities with low boiling temperature and/or the expulsion of the gaseous impurities. With such an increased separating effect it is possible to achieve a high degree of efficiency in the overall operation of the installation, particularly with regard to preheating and pre-cleaning of the treatment liquid. This can further be achieved when the treatment fluid is preheated as closely as possible to the evaporation temperature of the base liquid in the preheating heat exchanger of the preheating separator device, after which the treatment fluid is conveyed into a carrier gas admixing device, which promotes a subsequent dispersion of the preheated and pre-cleaned treatment fluid in the carrier gas.

In an especially advantageous embodiment, treatment fluid is preheated in a preheating heat exchanger of every preheating separator device as a component of the separating unit and conveyed to a relaxation device resulting in an effective separation of the vaporous impurities with low boiling temperature and/or gaseous impurities. It can be especially advantageous for the vaporous impurities with low boiling temperature and/or the gaseous impurities to be conveyed from the relaxation device via a conduit to a cooling device with a heat exchanger that is an additional component of the separator unit, and then stored in a collecting container so that a negative pressure is produced in the conduit during the cooling process, which sucks the separated impurities out of the relaxation device. This results in an effective separation and removal of the impurities, without great expenditure in components and devices. The relaxation device can be achieved using an upstream connected pump or by a pervaporation membrane system.

Furthermore, as a result of the expelling gaseous impurities from the treatment fluid before the admixing of the carrier gas, these gaseous impurities cannot increase in the closed carrier gas circuit. Downtimes of the installation for the separation of gaseous impurities from the carrier gas are thereby advantageously avoided so that an overall economic operation with long running times of the installation according to the invention becomes possible. Again, this is due to the removal of the fluid impurities with low boiling temperatures before the admixing of carrier gas to the treatment fluid.

A further advantageous application of the method is achieved if each preheating heat exchanger comprises a condensate/treatment fluid heat exchanger where preheating is obtained by means of the hot condensate coming from the condensate container. In addition to this, additional heat can be supplied for the preheating of the treatment fluid in a condensate/treatment fluid heat exchanger by the hot concentrate coming out of the concentrate collector container, whereby the condensate/treatment fluid heat exchanger is provided upstream of the preheating separator device of which at least one is provided. By applying the method in this manner, the overall expenditure in energy can be reduced considerably because nearly all hot currents are used to heat colder currents.

This also applies when at least part of the heat for evaporation is directed into the damp carrier gas, and vapor is supplied in at least one evaporator/condensation heat exchanger by the outgoing, compressed and cleaned mixture of carrier gas and dry vapor.

Furthermore the invention provides for the carrier gas to be conveyed in a separate carrier gas circuit between a condensate separator unit and a carrier gas admixing device and to be fed directly and/or indirectly into a carrier gas supply conduit in order to minimize the losses in carrier gas. As a result, and depending on the process parameters, the carrier gas can be conveyed either directly to the carrier gas supply conduit and, in addition or alternatively, through the carrier gas circuit with gas drying and gas recovery to the carrier gas supply conduit. This considerably increases the flexibility in applying the method to different treatment fluids to be cleaned. Advantageously, with this construction and arrangement of a closed carrier gas circuit, inert gases can be used as carrier gas due to the minimal losses in carrier gas. Inert gases being preferred to normal air as the carrier gas because, unlike air, they do not react with other components, particularly gaseous components, of the treatment liquid.

Additionally, a gas dryer is preferably provided in the carrier gas circuit to dry the carrier gas. Such a gas dryer is connected after the condensate collecting container in order to dry damp remaining carrier gas coming from the condensate collecting container and to convey it to the carrier gas circuit in the desired dry state.

In a preferred embodiment, at least one gas conduit goes in a circuit from the condensate separator unit, via a condensate collecting container and an intercalated gas dryer, back to the carrier gas supply line. With a carrier gas circuit of this type it is possible to keep the losses in carrier gas in the device as low as possible, since the carrier gas still present in the circuit is also recycled and brought back in the circuit to the carrier gas supply conduit. Thereby an extremely economical operation of the installation is possible.

Typically after a long operating time, losses of carrier gas nevertheless occur in the system. However, carrier gas can easily be fed in via a carrier gas tank connected to the carrier gas circuit by simple coupling into the already existing carrier gas circuit, so that the devices can be operated continuously.

In addition, an oxygen container with an oxygen evaporator for wet oxidation can be integrated into this carrier gas circuit and hooked up as needed.

It is furthermore possible to provide a second condensate separator unit as an emergency relief condensate separator unit, to which a mixture of carrier gas and dry vapor and/or vapor can be conveyed via the bypass conduit in the event that the main conduits are closed off or the flow reduced. Thereby increasing operating safety while allowing continued operation. Such an emergency relief condensate separator unit can furthermore easily be integrated into the system by direct feeding carrier gas into a carrier gas supply conduit going to the admixing device or into a carrier gas circuit, possibly with subsequent drying in a gas dryer. In this way the overall flexibility of an installation is increased so that it is possible to react rapidly to certain operating states and the process can be applied in an optimal manner.

Preferably at least part of the feed conduit a first concentrate separator unit to a second condensate separator unit is designed as a pressure conduit for the mixture of carrier gas and dry vapor, with an upstream compressor to increase pressure and temperature of the mixture of carrier gas and dry vapor. In this instance at least one measuring device, preferably at least one flow-through measuring device and/or at least one temperature measuring device and/or at least one pressure measuring device is installed in the pressure conduit to monitor the operation as components of a control circuit.

In case of insufficient compression heat, as is particularly the case during start-up operations, the compression conduit is preferably connected to a heat generator, or a heat exchanger that can be switched on and/or off automatically. If two evaporator/condensation heat exchangers are used, these are controlled either as individual aggregates or as a combined aggregate.

Each system component can be adjusted according to set and desired indications. For this purpose at least one actuator, preferably at least one control valve and at least one measuring device, preferably a temperature measuring device and/or pressure measuring device and/or pressure flow measuring is provided, each being coupled to a regulator. Thereby optimal process application adapted to the fluids and their components to be cleaned is made possible.

To ensure great operating safety of the installation, a clarifying device is furthermore provided by means of which the evaporator/condensation heat exchangers can be clarified using condensate coming from a degassing container.

For environment-friendly emergency relief, an exhaust filter can be provided through which relief into the space free of operating pressure is effected.

With reference to the drawings, the invention will now be described in more detail. In the application of a method according to FIG. 1, treatment fluids such as waste liquids generated in production, solvents in various dilutions or seawater and/or brine, are conveyed via the admission 1 into a pump sump 2, possibly in a pre-cleaned state. A concentrate/treatment fluid heat exchanger 101 installed in pump sump 2 preheats the liquid. This preheating is measured by a temperature-measuring device generally known in the art, which is not shown.

The now preheated treatment fluid is then conveyed via a pump 4 to the preheating and pre-cleaning systems of a first preheating separator device, consisting of several subcomponents designated by reference numbers 8, 9, 14, 15, 16. The subcomponents of the preheating separator device comprise a pretesting heat exchanger 8, and a separator unit designated by reference numbers 9, 14, 15, 16 downstream of the preheating heat exchanger 8. Preheating heat exchanger 8 is designed as a condensate/treatment fluid heat exchanger in which the temperature of the treatment fluid to be cleaned is heated as close as possible to a desired evaporating temperature, depending on the pressure present.

Preferably, in order to prevent the pump from running dry, a fullness-measuring device not shown, is provided in pump sump 2. This fullness-measuring device ensures that concentrate/liquid heat exchanger 101 is always covered with liquid and that pump 4 can be subjected to sufficient admission pressure. This admission pressure is variable and depends on the temperature of the waste liquid to be treated. The minimum switching point of the fullness-measuring device is adapted continuously through a link to the temperature-measuring device.

The admission to pump 4 takes place through an admission/suction conduit 3 out of pump sump 2, whereby the treatment fluid, for example a waste liquid with various liquid impurities, is conveyed via a pressure conduit 5 having an integrated check valve 6 and a gate valve 7, as well as via condensate/treatment fluid heat exchanger 8, to a relaxation device 9 consisting of a relaxation container with a pump that constitutes a component of the separator unit designated generally by reference numbers 9, 14, 15, 16. Here vapor impurities produced as a function of the liquids boiling temperature and/or the inert gas present is separated from the preheated fluid. As a further part of the separator subcomponents, separated vapor and/or gas is conveyed via a conduit 14 to a cooling device with heat exchanger 15 and is stored in a liquefied form in a collecting container 16. During the cooling process a negative pressure is produced In conduit 14 due to the removal of the generated vapor from relaxation device 9. If non-azeotropic fluids with different boiling point temperatures capable of being evaporated are present in the waste liquid to be treated, a series of preheating gas/separator units 12, 17, 18, 19 are provided. Combined with an application of the method whereby a carrier gas is supplied to the treatment fluid as the conveying gas, it is possible to effect a multi-step fractioned separation of liquid impurities with low boiling point and/or gaseous impurities from the treatment fluid.

The pre-cleaned treatment fluids preheated to optimal temperature through the multi-step preheating arrangement are dispersed throughout the carrier gas flow in admixing device 21, which is connected to a carrier gas/drive gas supply conduit 39 and with a damp vapor carrier gas conduit 20 so that spontaneous evaporation is possible. The damp mixture of carrier gas and treatment fluid vapor resulting from this goes through the mixture conduit 20 into an evaporator/condensation heat exchanger 23 in which additional heating takes place in order to overheat the mixture of carrier gas and vapor. Additional heating can be provided if necessary in this case by using an additional evaporator/condensation heat exchanger 27. This evaporator/condensation heat exchanger 23 is connected or disconnected by opening or closing the valves 22, 24 and 25. The same control is possible with the evaporator/condensation heat exchanger 27 by opening and/or closing the valves 26, 28 and 29. The required temperatures and operating pressures of the mixture of carrier gas and vapor are dependent in this case on the content materials to be separated and the thermal magnitudes of the waste liquids to be cleaned. Temperatures between 50° C. and 250° C. as well as operating pressures between 0.5 and 20 bar may therefore be necessary.

The damp mixture of carrier gas and vapor with liquid residues having higher boiling points than the base liquid, or with the salt in the base liquid of the treatment fluid to be cleaned, is then fed into a concentrate separator unit 30 in which this liquid residue and/or brine can be separated in the form of concentrate. In this process this concentrate separator unit 30 can be designed as a cyclone or baffle plate separator unit. If a baffle plate separator unit is used, single plate as well as multi-plate separator units can be used.

The mixture of carrier gas and dry vapor that now no longer contains any residual liquid leaves concentrate separator unit 30 through a conduit 32 and is brought by means of a compressor 31 to the operating pressure that is optimal for a mixture of carrier gas and dry vapor, while the temperature is increased at the same time. This mixture of carrier gas and dry vapor goes via a pressure conduit 32 to the evaporator/condensation heat exchanger 27, 23 where it is cooled while the dry vapor of the mixture of carrier gas and dry vapor, i.e. the base liquid of the treatment fluid, condensates, and the damp mixture of carrier gas and vapor flowing from the admixing device 21 to the concentrate separator unit 30, is heated.

The condensate is then separated in a condensate separator unit 38. A cyclone or a baffle plate separator unit, whether a single-plate or multi-plate separator unit, can be used here as well.

The carrier gas freed of condensate in condensate separator unit 38 can be fed directly back, via the carrier gas conduit 39 into which a locking device 40 is integrated, to the admixing device 21. Any gas that cannot be dissolved in the applicable liquids or can only be dissolved with difficulty can be used as carrier gas.

The condensate occurring in condensate separator unit 38 is diverted via a condensate run-off conduit 41 equipped with a locking device 42 into a condensate-collecting container 43, whereby a run-off as free as possible of carrier gas loss is achieved via a level measurement, in combination with a control valve 42. The overhead product of condensate-collecting container 43, which still contains components of carrier gas, is conveyed to an exhaust conduit 54 connected to condensate-collecting container 43 at the overhead side and is then again conveyed via a gas dryer 55 with downstream connected condensate separator unit 56 to the carrier gas drying system, as well as via gas conduit 109 in an additional carrier gas circuit to carrier gas supply line 39. A compressor 108 is furthermore provided in this carrier gas circuit.

The condensate is conveyed from the condensate-collecting container 43 via condensate/treatment fluid heat exchangers 11 and 8, constituting the preheating-heat exchangers of the preheating separator devices, while the prevailing operating pressure is decreased by means of a run-off conduit 44 and is fed into a degassing container 52. As the condensate passes through condensate/treatment fluid heat exchangers 11 and 8, a heat transfer takes place in the manner described earlier to the treatment fluid conveyed to admixing device 21 via pressure conduits 5, 10 and 13 in order to preheat it and to separate gaseous and/or impurities with low boiling points.

The degassing container 52 serves to remove the gaseous materials dissolved in the condensate under prevailing operating pressure conditions following the relaxation. The condensate can then flow off through condensate run-off 53.

By means of valves 25 and 29 in mixture conduit 20, it is possible to switch over to evaporator/condensation heat exchangers 23, 27 as single aggregate or as overall aggregate. For this it is necessary that the mixture of carrier gas and dry vapor of pressure conduit 32 be conveyed through bypass conduits 83, 85 or 87 and through bypass conduit 75, depending on the required control. Control valves 34, 35, 36 and 37 in pressure conduit 32 and control valves 84, 86 and 88 in bypass conduits 83, 85, 87 and 75 are used for this.

An additional, second condensate separator unit as an emergency/relief condensate separator unit 82 can be connected to bypass conduit 75 in order to relieve condensate separator unit 38. The condensate occurring in emergency/relief condensate separator unit 82 is conveyed via condensate conduits 89, 92 into condensate run-off conduit 41 of condensate separator unit 38 and is then conveyed to the condensate-collecting container 43. The condensate-free carrier gas separated in emergency/relief condensate separator unit 82 can be fed either via a conduit 95 directly into carrier gas/driving gas supply line 39 or, depending on the prevailing process conditions, through conduit 97 to exhaust conduit 54 connected to condensate-collecting container 43, and can then be conveyed via gas dryer 55 with downstream condensate separator unit 56 to the carrier gas drying system as well as via gas conduit 109, and using an additional carrier gas circuit, to carrier gas/driving gas supply line 39.

As can be further seen in the flow chart of FIG. 1, a carrier gas storage container 103 can be integrated into the carrier gas circuit in order to compensate for a loss of carrier gas during the operation of the installation. This carrier gas compensation takes place while using an evaporator that is not shown here, via a gas conduit 106 in which a control valve 107 is installed. Accordingly, the compensation carrier gas is fed into gas conduit 54 in front of a suction connection of carrier gas compressor 108. Carrier gas storage container 103 itself is secured by a draining system containing a drain pipe 104 and a drain valve 105.

In addition, an exhaust air filter 65 is provided for emergency relief, whereby the relief is effected starting at pressure conduit 32 via a first conduit assemblage 75, 83, 85, 87 and emergency/relief condensate separator unit 82, as well as via a second conduit assemblage 95, 97, 54, 63, 66 and valves 64 and 67, as well as exhaust air filter 65. The condensate occurring in emergency/relief condensate separator unit 82 is returned into pump sump 2 via conduit 89 while control valves 90, 91 are open.

In order to make the required quantities of oxygen available during a wet oxidation, an oxygen container with oxygen evaporator 58 is provided that can be connected via an oxygen conduit 59 with a control valve 60 to gas conduit 54 of the carrier gas circuit and can thereby be connected to carrier gas compressor 108. The oxygen supply is controlled in this case via an oxygen-measuring device, not shown here, that is installed in pressure conduit 32 of the circuit of the mixture of carrier gas and dry vapor. A pressure relief conduit 61 with a relief valve 62 is provided on the oxygen container with oxygen evaporator 58 in order to secure the pressure, and is controlled by a pressure-measuring device installed on the oxygen container 58.

The concentrate occurring in concentrate separator unit 30 is conveyed via a concentrate run-off conduit 68 to a concentrate-collecting container 70. Here a derivation of the concentrate free of carrier gas is ensured via a control valve 69. The concentrate is introduced into concentrate-collecting container 70 below the minimum concentration level, so that a precipitation of vapor can occur.

If vapor forms, the vapor can be precipitated by means of a vapor compressor 73 and 73a via conduits 71, 80 and 75 with valves 72, 74, 76 and 81 and possibly via an especially advantageous and preferred vapor condensation device consisting of a cooling device 78 with condensate collecting container 79, and by way of emergency/relief condensate separator unit 82 can then be fed back via condensate conduit 89 into pump sump 2.

The control of vapor compressor 73 and 73a and of corresponding control valves 72, 74, 76, 81 is effected by means of a pressure measuring device, not shown here, on the concentrate-collecting container 70.

Vapors that can possibly be used can be conveyed through a vapor conduit 71 into the pressure conduit 32.

The concentrate contained in concentrate-collecting container 70 is conveyed via an outlet conduit 99 via condensate/treatment fluid heat exchanger 101 in which a heat transfer from the hot concentrate to preheat the liquid fed in at admission 1 takes place. To avoid jolts in the process, a control valve 100 is installed in outlet conduit 99 and is controlled via a level-measuring device in concentrate-collecting container 70.

When the compression heat is not sufficient, as may be the case during start-up operation, it is possible to set the required reaction temperature by adding an external heat source consisting of a heat source 120 with integrated heat exchanger, which is connected through valves 121 and 122 to pressure conduit 32. For this, the mixture of carrier gas and vapor is conveyed into the heat exchanger of heat generator 120, whereby the pressure conduit 32 is closed off by valve 33.

Automated connection of this external heat source 120 can be effected via a temperature-measuring device not shown here, in combination with control valves 33, 121 and 122. This external heat source is normally switched off via a temperature-measuring device that is also not shown here, with a reversed switching of the above-mentioned control valves 33, 121 and 122.

To clarify evaporator/condensation heat exchangers 23 and 27, a clarifying device is provided, comprising a condensate pump 112 that is connected via a suction conduit 110 and valve 111 to degassing container 52. In this case the condensate can be fed via a condensate pressure conduit 113, 116 and 118 into an admixing device 21 and into the carrier gas-wet vapor conduit 20 and 32 to achieve clarification.

To monitor the operation, a pressure measuring device, a temperature measuring device and a flow-through quantity measuring device, neither of which is shown here for the sake of clarity, are provided in condensate pressure conduit 113 in order to effect the clarification.

Figure 2:
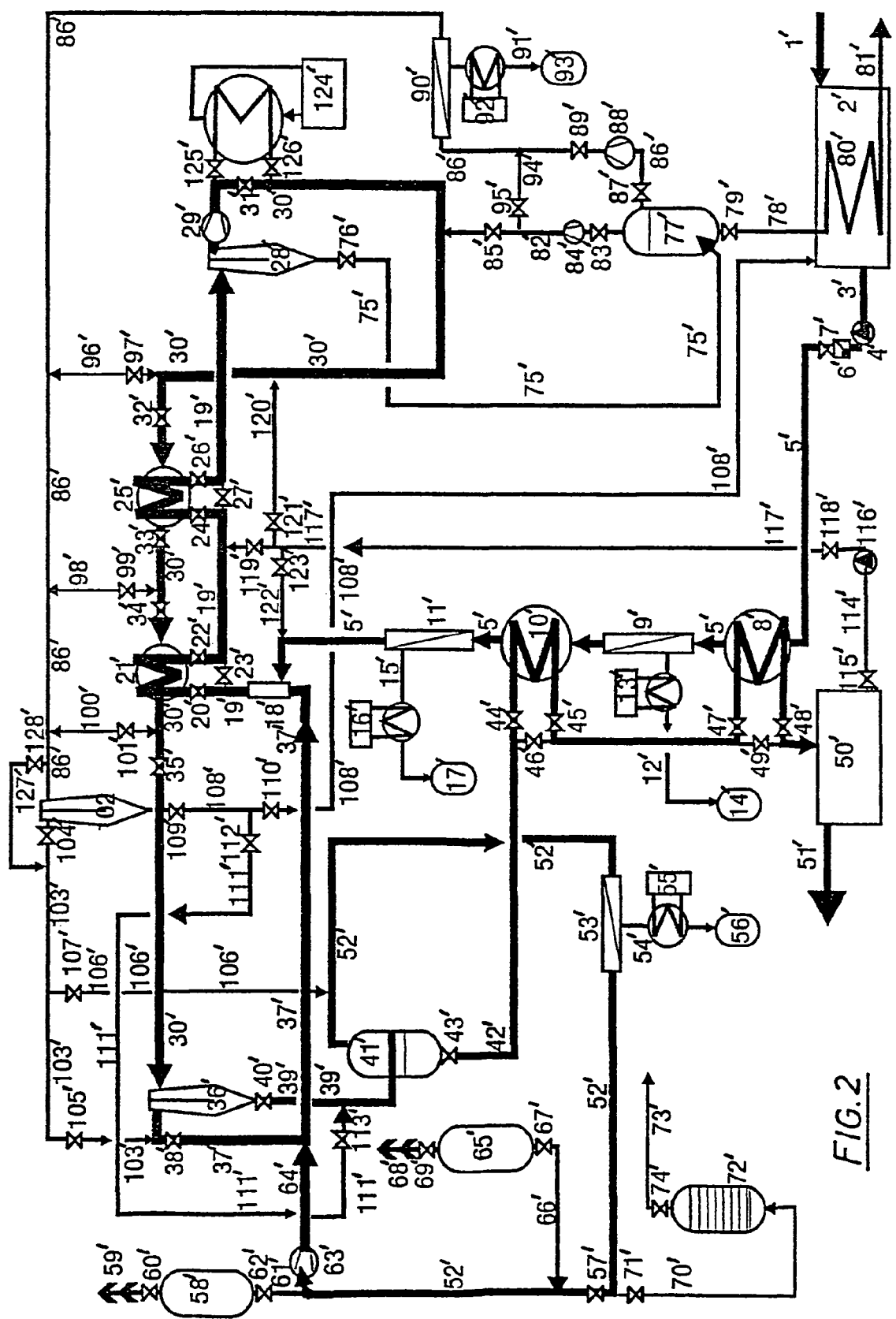

A partially alternative application of the method is shown in the flow chart according to FIG. 2, whereby waste liquids generated in production, such as solvents in different dilutions, seawater, and/or brine are conveyed via admission 1' into a pump sump 2', possibly in a pre-cleaned condition, to obtain drinking and service water.

Following this, the thus preheated treatment fluid is conveyed via a pump 4' for preheating and pre-cleaning to a first preheating separator device designated by subcomponents 8', 9', 12', 13', 14' provided with preheating heat exchanger 8' and a separator unit represented by subcomponents 9', 12', 13', 14' following the preheating heat exchanger 8'. The preheating heat exchanger 8' is designed as a condensate/treatment fluid heat exchanger, in which the temperature of the treatment fluid to be cleaned is heated as a function of the existing pressure as closely as possible to a desired evaporation temperature.

To prevent pump 4' from running dry, a fullness-measuring device, not shown, is provided in pump sump 2'. This fullness-measuring device ensures that concentrate/waste liquid heat exchanger 80' is always covered with liquid and that pump 4' can be subjected with sufficient admission pressure. This admission pressure is variable and depends on the waste liquid to be processed. The minimum switching point of the fullness-measuring device is continuously adapted through a link to the temperature-measuring device.

The admission to pump 4' takes place through an admission/suction conduit 3' out of pump sump 2', whereby the treatment fluid/waste liquid is conveyed via a pressure conduit 5', having an integrated check valve 6' and a gate valve 7', as well as via condensate/treatment fluid preheating heat exchanger 8' as a preheating heat exchanger, to a relaxation device 9' that is a component of the separator unit, in the form of a pervaporation membrane device. Here the vapor produced is a function of its boiling temperature and/or the inert gas present, e.g. in seawater and/or brine or of the present and generated $CO_2$, which is separated from the preheated treatment fluid. The separated vapor and/or gas is conveyed via a conduit 12' to a cooling device with heat exchange 13' and is stored in a liquefied form in a collecting container 14'. During the cooling process a negative pressure is produced in conduit 12' due to the diversion of the generated vapor from the relaxation device 9'. If non-azeotropic fluids with different boiling point temperatures capable of being evaporated are present in the waste liquid to be treated, a series of preheating gas/separator units 10', 11', 15', 16', 17' are provided. Combined with an application of the method whereby a carrier gas is supplied to the treatment fluid as the conveying gas, it is possible to effect a multi-step fractioned separation of liquid impurities with low boiling point and/or gaseous impurities, from the treatment fluid.

In admixing device 18 which is connected to a carrier gas/conveying gas supply conduit 37' and a carrier gas/damp vapor conduit 19', the pre-cleaned treatment fluid, preheated to the optimal temperature by multi-step preheating is dispersed in the carrier gas stream so that spontaneous evaporation is possible. This thereby resulting damp mixture of carrier gas and vapor flows through mixture conduit 19' into an evaporator/condensation heat exchanger 21' in which additional heating takes place for the purpose of overheating the mixture of carrier gas and vapor. If necessary, additional heating can be effected by means of an additional evaporator/condensation heat exchanger 25'. This evaporator/condensation heat exchanger 21' is connected or switched off by opening or closing valves 20', 22' and 23'. The same control is possible for the evaporator/condensation heat exchanger 25' by opening and/or closing valves 24', 26' and 27'. The needed temperatures and operating pressures of the mixture of carrier gas and vapor depend in this case on the contained materials to be separated and on the thermal values of the waste liquids to be cleaned. Temperatures from 50° to 250° as well as operating pressures from 0.5 bar to 20 bar may therefore be needed.

The damp mixture of carrier gas and vapor with the liquid residue having a higher boiling point temperature than the base liquid, or with the salts of the treatment fluid contained in the base liquid, is then fed into a concentrate separator unit 28' in which the liquid residue and/or brine is separated as concentrate. In this process, concentrate separator unit 28' may be designed as a cyclone or buffer plate separator unit. If a buffer plate separator unit is used, single-plate as well as multi-plate separator units can be used.

The mixture of carrier gas and dry vapor which no longer contains any residual liquid leaves concentrate separator unit 28' via a conduit 31' and is adjusted to the optimal operating pressure for a mixture of carrier gas and dry vapor while the temperature is raised. This mixture of carrier gas and dry vapor flows through a pressure conduit 30' to evaporator/condensation heat exchangers 25', 21' where it is cooled while the dry vapor of the mixture of carrier gas and dry vapor, i.e. of the base liquid of the treatment fluid, is condensed and the damp mixture of carrier gas and vapor flowing from admixing device 18' to concentrate separator unit 28' is heated.

The condensate is then separated in a condensate separator unit 36'. Here too a cyclone or a buffer plate separator unit, whether a single-plate or multi-plate separator unit, can be used as condensate separator unit 36'.

In a first application of the method, the carrier gas, freed in condensate separator unit 36' of condensate, can be fed back via carrier gas conduit 37', into which a locking device 38' is integrated, directly to admixing device 18'. Any gas that cannot be dissolved in the applicable liquids or can only be dissolved with difficulty, e.g. inert gas, can be used as carrier gas.

The condensate occurring in condensate separator unit 36' is diverted via a condensate run-off conduit 39' equipped with a locking device 40 into a condensate collecting container 41', whereby a run-off as free as possible of carrier gas loss is achieved via a fullness-measurement system, in combination with a control valve 43'. The overhead product of the condensate-collecting container 41' which still contains components of carrier gas, is withdrawn at to an exhaust conduit 52' connected to condensate-collecting container 41' at the overhead side and is then again conveyed via an evaporation device 53' to the carrier gas drying apparatus as well as via a gas conduit 64', and in an additional carrier gas circuit again to carrier gas supply conduit 37'. A compressor 63' is furthermore provided in this carrier gas circuit. Evaporation device 53', preferably a pervaporation membrane, is followed by a cooling device with heat exchanger 55' that is in turn followed by a condensate-collecting container 56'. During the cooling process a negative pressure is produced in conduit 54' by means of which the condensate separated in the pervaporation membrane 53' is sucked out of it.

The condensate is conveyed out of condensate-collecting container 41' via condensate/treatment fluid heat exchangers 10' and 8' constituting the preheating heat exchangers of the preheating separator device, while the existing operating pressure is reduced, and by means of a run-off conduit 42' directed into a degassing container 50'. As the condensate flows through condensate/treatment fluid heat exchangers 10' and 8', a heat transfer takes place in the previously described manner to the treatment liquid conveyed via pressure conduit 5 to admixing device 18' to preheat it and to separate gaseous and/or impurities with low boiling points.

Following the relaxation, degassing container 50' is used to remove the gaseous substances dissolved in the condensate under the prevailing conditions of operating pressure. The condensate can then flow off via condensate run-off 51'.

By means of valves 23' and 27' in mixture conduit 19', it is possible to switch as needed to evaporator/condensation heat exchangers 21', 25' as single aggregates or overall aggregate. For this it is necessary that the mixture of carrier gas and dry vapor be introduced into pressure conduit 30', depending on the control required, bypass conduits 96', 98' and 100' or via bypass conduit 86'. Here control valves 32', 33', 34' and 35' in the pressure conduit 30', and control vales 97', 99' and 101' in bypass conduits 96', 98', 100' and 86' are used for control.

In order to relieve the condensate separator unit 36', an additional, second condensate separator unit can be connected to bypass conduit 86' as an emergency relief condensate separator unit 102'. The condensate occurring in the emergency relief condensate separator unit 102' is conveyed via condensate conduits 108' and 111' into condensate run-off conduit 39' of first condensate separator unit 36', and then to condensate collecting container 41'. The condensate-free carrier gas separated at the emergency relief condensate separator unit 102' can be fed either directly via a conduit 103' into carrier gas feed conduit 37' or, depending on the prevailing process conditions, via conduit 106' to exhaust conduit 52' connected to condensate collecting container 41' and then via pervaporation membrane 53' to the carrier gas drying system, as well as via gas conduit 64' in an additional carrier gas circuit, and also to carrier gas feed conduit 37'.

As can further be seen in the flow chart of FIG. 2, a carrier gas storage container 58' can also be integrated into the carrier gas circuit in order to compensate for any loss of carrier gas during the operation of the installation. This compensation of carrier gas takes place while utilizing an evaporator, not shown, via a gas conduit 61', in which a control valve 62' is installed, whereby the compensation carrier gas is fed before a suction connection of carrier gas compressor 63' into gas conduit 52'. Carrier gas storage container 58' is secured by an outlet device comprising an outlet pipe 59' and an outlet valve 60'.

In addition an exhaust air filter 72' is provided for emergency relief, whereby the relief is effected starting at pressure conduit 30' via a first conduit assemblage 86'', 96', 98', 100' and the emergency/relief condensate separator unit 102', as well as via a second conduit assemblage 103', 106', 52', 70', 73' and the valves 71' and 74', as well as exhaust air filter 72'. The condensate occurring in the emergency/relief condensate separator unit 102' is returned into pump sump 2' via conduit 108', while control valves 109', 110' are open.

In order to make the required quantities of oxygen available during a wet oxidation, an oxygen container 65' with oxygen evaporator is provided that can be connected via an oxygen conduit 66' with a control valve 67' to gas conduit 52' of the carrier gas circuit and can thereby be connected to carrier gas compressor 63'. The oxygen supply is controlled in this case via an oxygen-measuring device, not shown here, that is installed in pressure conduit 30' of the circuit of the mixture of carrier gas and dry vapor. A pressure relief conduit 68' with a relief valve 69' is provided on oxygen container 65' with the oxygen evaporator in order to secure the pressure, and is controlled by a pressure-measuring device installed on oxygen container 65'.

The concentrate occurring in concentrate separator unit 28' is conveyed via a concentrate run-off conduit 75' to a concentrate-collecting container 77'. Here a derivation of the concentrate free of carrier gas is ensured via a control valve 76'. The concentrate is introduced into concentrate-collecting container 77' below the minimum concentration level, so that a precipitation of vapor can occur.

If vapor forms, the vapor can be precipitated by means of a vapor compressor 84', 88' via conduits 82', 86' and 94' with valves 83', 85', 87', 89' and 95' via an especially advantageous and preferred vapor condensation device, possibly with a vaporization device 90', consisting of a cooling device 92' with condensate collecting container 93', and by way of emergency relief condensate separator unit 102' and can then be fed back via condensate conduit 108' into pump sump 2'.

Vapor compressor 84' and 88' and the corresponding control valves 83', 85', 87', 89', 95 are controlled via a pressure measuring device, not shown, on concentrate collecting container 77'.

For vapor that could possibly be used, vapor conduit 82' makes it possible to convey occurring vapor into pressure conduit 30'.

The concentrate contained in concentrate collecting container 77' is conveyed to a further utilization location via an outlet conduit 78' and via concentrate/waste liquid heat exchanger 80' in which heat is transferred from hot concentrate to preheat the liquid conveyed to admission 1'. To avoid jolts in the process, a control valve 79' is installed in outlet conduit 78' and is controlled via a fullness-measuring device in concentrate-collecting container 77'.

When the compression heat is not sufficient, as may be the case during start-up operation, it is possible to set the required reaction temperature by adding an external heat source consisting of a heat generator 124' with integrated heat exchanger, which is connected through valves 125' and 126' to pressure conduit 30'. For this, the mixture of carrier gas and vapor is conveyed into the heat exchanger of heat generator 124', whereby pressure conduit 30' is closed off by valve 31'.

Automated connection of this external heat source 124' can be effected via a temperature-measuring device not shown here, in combination with control valves 31', 125' and 126'. This external heat source is preferably always switched off via a temperature-measuring device that is also not shown here, with a reversed switching of the above-mentioned control valves 31', 125' and 126'.

To clarify the evaporator/condensation heat exchangers 21' and 25', a clarifying device is provided, comprising a condensate pump 116' that is connected via a suction conduit 114' and valve 115' to degassing container 50'. In this case the condensate can be fed via a condensate pressure conduit 117', 120' and 122' into an admixing device 18' and into the carrier gas-wet vapor conduit 19' and 30' to achieve clarification.

To monitor the operation, a pressure measuring device, a temperature-measuring device and a flow-through quantity measuring device, neither of which is shown here for the sake of clarity, are provided in condensate pressure conduit 117' in order to effect the clarification.

While a preferred embodiment of the invention has been described using specific terms, such description is for illustrative purposes only, and it is to be understood that changes and variations may be made without departing from the spirit or scope of the following claims.

The invention claimed is:

1. A method for treating fluids containing a variety of liquid, gaseous, and saline impurities contained or dissolved in the fluid by separating the impurities from the fluid, said method comprising the steps of:
    conveying a treatment fluid, defined as a base liquid containing impurities, to a preheating separating device in which said treatment fluid is preheated to a temperature below the boiling temperature of said base liquid, so that impurities with lower boiling points than said base liquid are separated from said base liquid;
    conveying a carrier gas to the treatment fluid through a closed carrier gas circuit for mixing with said treatment fluid;
    evaporating the mixture of carrier gas and treatment fluid in such a manner that said base liquid is evaporated and impurities having boiling temperatures higher than the boiling point of said base liquid are left behind as a residual fluid portion, and said mixture of carrier gas and treatment fluid forms a damp mixture of carrier gas and treatment fluid vapor;
    conveying said damp mixture of carrier gas and treatment fluid vapor to a concentrate separator unit from said residual fluid portion so that said residual fluid portion is separated from said damp mixture of carrier gas and treatment fluid vapor as a concentrate;
    compressing said mixture of carrier gas and treatment fluid vapor into a mixture of carrier gas and dry treatment fluid vapor;
    cooling said mixture of carrier gas and dry treatment fluid vapor;
    conveying said mixture of carrier gas and dry treatment fluid vapor to a downstream condensate separator unit so that said dry treatment fluid vapor condenses and is separated from said carrier gas; and,
    returning carrier gas separated from said dry treatment fluid vapor back for remixing with said treatment fluid;
    whereby a variety of liquid, gaseous, and saline impurities contained or dissolved in the fluid and having different boiling points are removed from the treatment fluid.

2. The method of claim 1 including further conveying said treatment fluid consecutively through a first preheating separator device and at least a second preheating separator device to provide a series of linked preheating separator devices which each include a preheating heat exchanger and a separator unit.

3. The method of claim 2 including preheating said treatment fluid in at least one said preheating heat exchanger of said preheating separator devices, and conveying said treatment fluid to a relaxation device, included in said separator unit, in which impurities with low boiling temperature than said base liquid are separated as vaporous impurities from the base liquid.

4. The method of claim 3 including conveying said vaporous impurities with a lower boiling temperature than said base liquid from said relaxation device, via a conduit having a cooling device with a heat exchanger, to said separator unit and storing said vaporous impurities in a collecting container of said separator unit in such a manner that a negative pressure is produced in said conduit by cooling said vaporous impurities passing through said conduit so that said vaporous impurities are sucked out of the relaxation device and into said collecting container.

5. The method of claim 4 wherein said preheating heat exchanger comprises a condensate treatment fluid heat exchanger in which preheating of the treatment fluid is effected by means of a heated condensate directed from a condensate container.

6. The method of claim 5 further including a concentrate treatment fluid heat exchanger installed upstream from said at least one preheating separator device for providing additional heat for the preheating of said treatment fluid by using a heated concentrate coming from a concentrate-collecting container.

7. The method of claim 6 wherein said treatment fluid is preheated to about the evaporation temperature of the base liquid in the preheating heat exchanger into which said carrier gas is conveyed to said treatment fluid for mixing.

8. The method of claim 7 including at least one evaporator condensation heat exchanger supplying a portion of heat needed for the evaporation of said base liquid into said damp mixture of carrier gas and treatment fluid vapor by at least partially condensing the out-flowing compressed mixture of said carrier gas and dry treatment fluid vapor in said at least one evaporator condensation heat exchanger.

9. The method of claim 8 wherein a first partial mass flow of said carrier gas separated at said condensate separator unit is conveyed directly to said treatment fluid for mixing, and a second partial mass flow of said carrier gas separated at said condensate separator unit is conveyed through a gas drying apparatus to be dried and is then fed back to said treatment fluid as dried carrier gas for mixing.

10. The method of claim 9 wherein said treatment fluid is dispersed by an admixing device into said dried carrier gas.

11. The method of claim 10 including conveying a catalyst into the preheated treatment fluid before said treatment fluid is introduced into said admixing device.

12. The method of claim 11 including providing a heat generator, having a heat exchanger, connected into a pressure conduit for heating said mixture of carrier gas and dry treatment fluid vapor.

13. The method of claim 12 wherein treatment fluid vapors occurring in said concentrate-collecting container are conveyed in a compressed state to said pressure conduit containing said mixture of carrier gas and dry treatment fluid vapor.

14. The method of claim 13 wherein treatment fluid vapors occurring in said concentrate-collecting container are further conveyed in a compressed state to a bypass conduit.

15. The method of claim 14 including providing a second condensate separator unit as an emergency relief condensate separator unit to which said mixture of carrier gas and dry treatment fluid vapor is conveyed via said bypass conduit while main conduits are closed or reduced.

16. The method of claim 15 wherein carrier gas separated from said treatment fluid vapor is conveyed from a gas outlet of said emergency relief condensate separator unit to the closed carrier gas circuit, and treatment fluid condensate is conveyed to a liquid outlet system of said condensate separator unit or, in the case of an emergency pressure reduction, to a pump sump.

17. The method of claim 16 wherein carrier gas in the closed carrier gas circuit is replenished from a closed carrier gas storage container in the event of a loss of carrier gas.

18. The method of claim 17 including a degassing container for removing remaining dissolved gaseous substances from said treatment fluid after relaxation.

19. The method of claim 18 including pumping a treatment fluid condensate from said degassing container into at least said evaporator condensation heat exchanger for clarifying.

20. The method of claim 19 wherein oxygen from an oxygen container, having an oxygen evaporator is conveyed in a controlled manner to said carrier gas for wet oxidation.

21. A device for separating impurities from a treatment fluid, wherein the treatment fluid includes a base liquid to be separated from a variety of liquid, gaseous, and saline impurities contained or dissolved in the base liquid, said device comprising:

at least one preheating separator device that includes at least one preheating heat exchanger and a separator unit disposed downstream of said preheating heat exchanger for preheating and pre-cleaning said treatment fluid;

said preheating heat exchanger preheating said treatment fluid to a temperature below the boiling temperature of said base liquid;

said separator unit pre-cleaning said treatment fluid by separating liquid impurities from said base liquid that have a boiling temperature lower than that of said base liquid;

an ad mixing device disposed downstream of said preheating separator device;

a closed carrier gas circuit conveying a carrier gas to said admixing device;

said admixing device providing a mixture of carrier gas and treatment fluid;

at least one evaporator condensation heat exchanger disposed downstream of said admixing device for evaporating the mixture of carrier gas and treatment fluid into a damp mixture of carrier gas and treatment fluid vapor in which said base liquid is evaporated and the liquid impurities with boiling temperatures above the boiling temperature of said base liquid are left over as a residual liquid portion;

a concentrate separator disposed downstream of said at least one evaporator condensation heat exchanger for receiving said damp mixture of carrier gas and treatment fluid vapor to separate from said residual liquid portion and providing a mixture of carrier gas and dry treatment fluid vapor from said damp mixture of carrier gas and treatment fluid vapor; and, a condensate separator disposed downstream of the concentrate separator to which said mixture of carrier gas and dry treatment fluid vapor is conveyed after passing through said evaporator condensation heat exchanger to condense said treatment fluid vapor and separate the treatment fluid from the carrier gas.

22. The device of claim 21 including a first preheating separator device and at least a second preheating separator device to provide a series of linked preheating separator devices arranged in a consecutive manner for preheating and pre-cleaning said treatment fluid.

23. The device of claim 22 wherein said separator unit includes a relaxation device for separating vaporous impurities from said base liquid which have a boiling point lower than that of said base liquid.

24. The device of claim 23 wherein said relaxation device comprises a relaxation container and pump.

25. The device of claim 23 wherein said relaxation device comprises a pervaporation membrane apparatus.

26. The device of claim 23 wherein said separator unit includes a cooling device having a heat exchanger, and a collecting container; said cooling device and collecting container following said relaxation device and being connected by a conduit having a negative pressure through which said vaporous impurities are sucked out of said relaxation device to be separated from said base liquid.

27. The device of claim 26 wherein said preheating heat exchanger includes a condensate treatment fluid heat exchanger for supplying additional heat to preheat said treatment fluid.

28. The device of claim 27 including a pressure conduit having a compressor for increasing the pressure and temperature of said mixture of carrier gas and dry treatment fluid vapor connecting said concentrate separator to said condensate separator for conveying said mixture of carrier gas and dry treatment fluid vapor from said concentrate separator to said condensate separator.

29. The device of claim 28 including at least one measuring device earned by said pressure conduit for monitoring pressure and temperature of said mixture of carrier gas and dry treatment fluid vapor.

30. The device of claim 29 wherein said pressure conduit is coupled via a heat exchanger to a heat generator to provide additional heat during start-up.

31. The device of claim 30 including at least one actuator, at least one control valve, and at least one measuring device each coupled to a control device and operatively associated with said heat generator for automatic switching on and off of the heat generator.

32. The device of claim 31 wherein said carrier gas is conveyed through a closed carrier gas circuit between said condensate separator and said admixing device so that a first partial mass flow of said carrier gas separated at the condensate separator can be conveyed directly to said admixing device via a carrier gas conveying conduit, and a second partial mass flow of the carrier gas separated at said condensate separator is conveyed to said admixing device.

33. The device of claim 32 including a gas dryer for drying carrier gas coming from said condensate collecting container.

34. The device of claim 33 wherein said gas dryer consists of a pervaporation membrane with a cooling device and heat exchanger connected to a downstream collecting container.

35. The device of claim 34 including at least one gas conduit leading from said condensate separator to said condensate collecting container through said gas dryer and back to a carrier gas feed conduit through a compressor.

36. The device of claim 35 including a carrier gas storage container connected to the carrier gas circuit for providing additional carrier gas to compensate for losses of carrier gas.

37. The device of claim 36 including an oxygen container connected to the gas conduit going from said condensate collecting container to the carrier gas feed conduit for a wet oxidation.

38. The device of claim 37 including a degassing container disposed downstream of said condensate collecting container for degassing treatment fluid condensate.

39. The device of claim 38 including a second condensate separator provided as an emergency relief condensate separator to which carrier gas and treatment fluid vapors can be conveyed from said concentrate collecting container via a bypass conduit from said concentrate separator.

40. The device of claim 39 wherein said emergency relief condensate separator is provided at a gas outlet having a gas exhaust conduit going to said carrier gas feed conduit and said admixing device.

41. The device of claim 40 including an emergency relief condensate separator provided at a condensate output with at least one condensate conduit going to said condensate collecting container.

42. The device of claim 41 including an exhaust air filter disposed in said pressure conduit and said emergency relief condensate separator for emergency relief of operating pressure into free space.

43. The device of claim 42 wherein condensate occurring in said emergency relief condensate separator is conveyed via a conduit to a pump sump at the admission of treatment fluid into the device.

44. The device of claim 43 including a clarification device comprising a condensate pump, a suction conduit, and a degassing container coupled via an admixing device into a corresponding process conduit for clarification of at least said evaporator condensation heat exchanger.

45. The device of claim 44 including a vapor condensation device comprising a cooling device with a condensate collecting container connected downstream of said concentrate separator for vapor precipitation.

* * * * *